March 5, 1935.  E. V. J. TOWER  1,993,126
VIBRATION DAMPENER
Filed Nov. 10, 1933  2 Sheets-Sheet 1

INVENTOR
Elmer V. J. Tower
BY
Arthur Wright
ATTORNEY

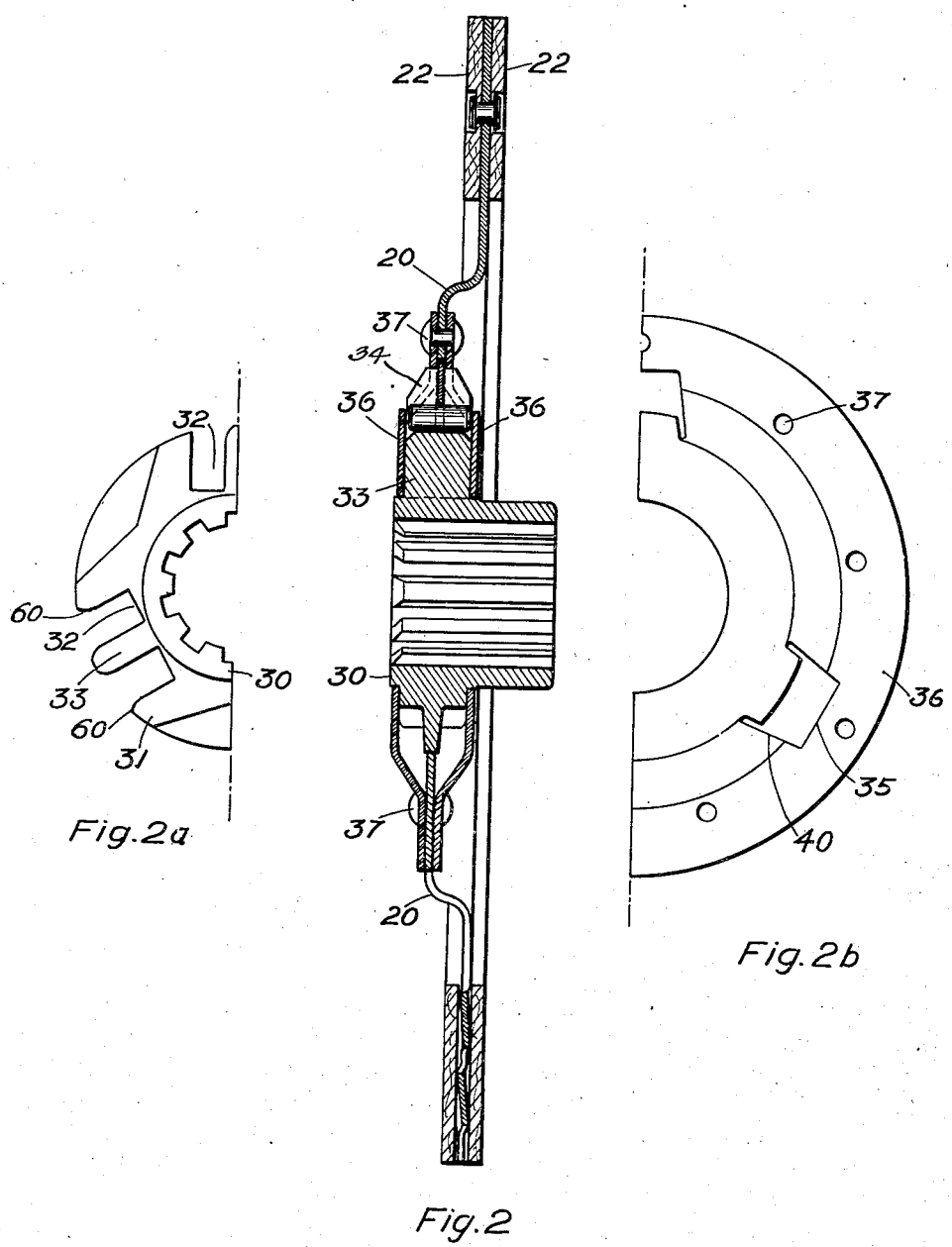

Patented Mar. 5, 1935

1,993,126

UNITED STATES PATENT OFFICE 1,993,126

VIBRATION DAMPENER

Elmer V. J. Tower, Lansing, Mich., assignor, by mesne assignments, to The Russell Manufacturing Company, Middletown, Conn., a corporation of Connecticut Application November 10, 1933, Serial No. 697,419

9 Claims. (Cl. 192—68)

This invention relates to vibration dampeners for power transmitting elements of the flexible or shock-absorbing type constructed to dampen and absorb torsional vibration between the driving element and the driven element of the power transmitting device.

The general purpose of such mechanism is to permit the driving of one element by the other, but at the same time to absorb or to diminish the torsional vibration.

The present invention is an improvement upon the type of vibration dampener shown and described in the joint application of the present applicant and Louis H. Harris, filed September 21, 1932, and bearing Serial No. 634,110. Such vibration dampeners as referred to, have a particular utility when used in a clutch mechanism, more especially the type of clutch employed in automobiles driven by internal combustion engines.

As explained in the Tower and Harris application referred to, these automobile engines develop torsional vibration which tends to be transmitted through the clutch disk to the driven shaft connected with the transmission gears. While the invention herein described is particularly useful in an automobile clutch of the kind referred to, its utility is not limited thereto.

The general manner of connection between the engine and the driven mechanisms of the automobile through the medium of the clutch, is now well understood and is referred to more in detail in the Tower and Harris application referred to. The utility of such vibration dampeners in automobile clutches, and the particular manner in which such vibration dampeners operate to absorb torsional vibration both for driving and for coasting of the engine, is likewise well known and is referred to in said Tower and Harris application.

The purpose of the present invention is to improve upon the form of vibration dampener shown in said application by making the same more effective for the variety of conditions under which such vibration dampeners have to operate in automobile use. These conditions cover a wide range of speeds, loads, and other factors, all of which have a bearing upon the functioning of such vibration dampeners, and the problems of which are now well recognized in this field.

In the application above referred to, the clutch includes a disk which is driven by frictional contact with an engine-driven member, and this disk is mounted loosely upon a center hub which in turn is connected to the transmission gears of the vehicle. Interposed between the disk and the hub are bundles of leaf springs which serve as the flexible driving connection between the driving disk and the driven hub and also absorb or diminish the torsional vibrations referred to.

In said application these bundles of leaf springs are arranged in pairs around the hub. The general purpose of the arrangement in pairs is explained in said application; in brief it is to permit the use of one bundle of a pair for driving, and the other bundle of the pair for coasting.

The present improvement comprises the utilization of a floating roller interposed between the two bundles comprising the pair of spring devices referred to.

With this description of the general purposes and construction, the details of the invention may be seen by reference to the accompanying drawings and the description which folows, namely:—

Fig. 1 represents a plan view of a clutch disk and hub member, showing the pairs of spring bundles, arranged around the flange of the hub, as above referred to;

Fig. 2 is a cross section of Fig. 1, taken on the line 2—2 in Fig. 1;

Fig. 2a is a fragmentary plan view of the hub showing the slots for insertion of the spring bundles;

Fig. 2b is another fragmentary view of one of the two retaining plates which are riveted to the driving disk, which plates are likewise formed with flaring-walled apertures for receiving the ends of the spring bundles referred to.

Figure 1:
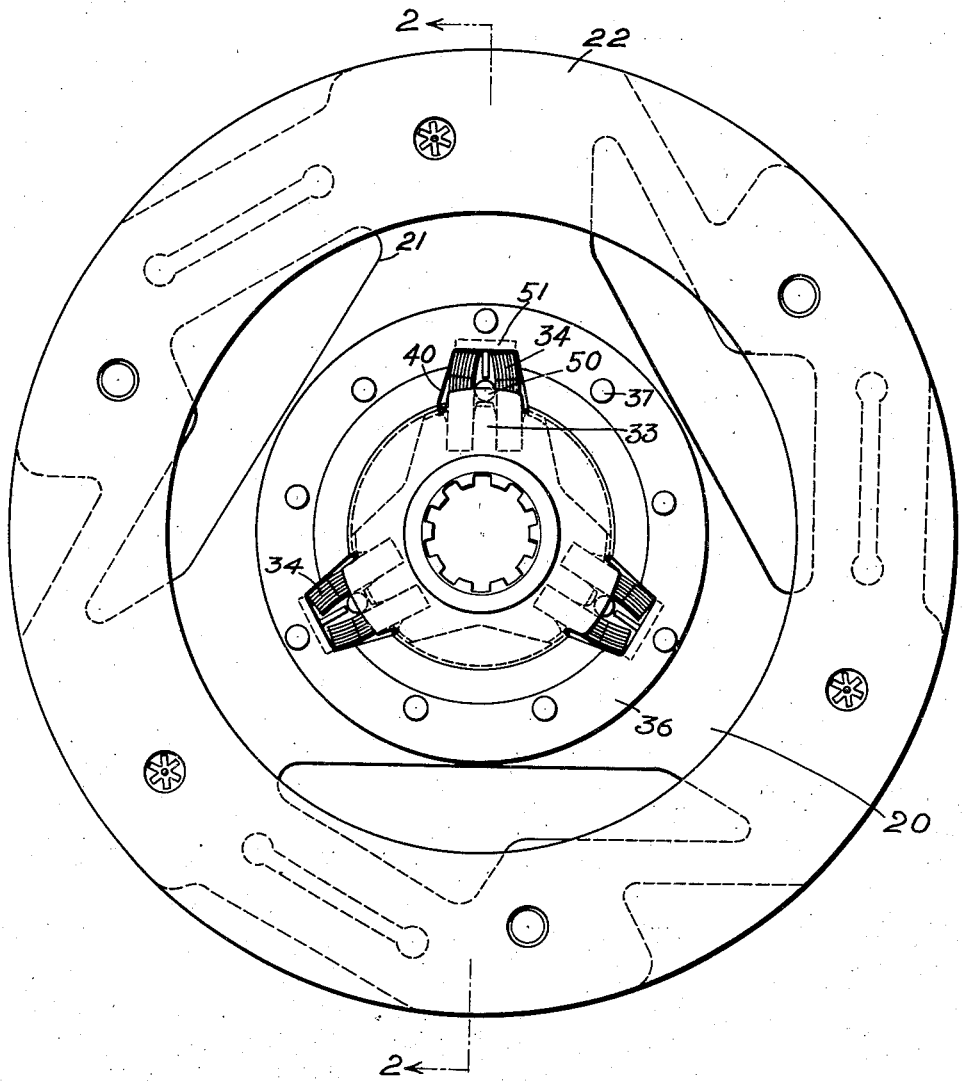

In said drawings, 20 represents the driving disk referred to, the disk being generally circular in contour but formed with various apertures 21 and having riveted to the outer periphery of the disk, and on each face thereof, annular bands 22 of friction material customarily used on friction plates of clutches of this sort.

The hub 30 is formed with splines for fastening the hub to the shaft which connects with the transmission gears. Integral with the hub is a flange 31 which is formed with a plurality of recesses 32, which are separated by intervening projections 33, the outer ends of which are slightly curved as shown in Figs. 1 and 2a. These recesses are for the insertion of the bundles of leaf-springs referred to.

These bundles of leaf-springs 34 are shown in Fig. 1 arranged in pairs around the flange of the hub and seated tightly in their respective hub sockets. Each pair of leaf-spring-bundles projects into confronting recesses 35 formed in the outward portion of two disk-plates 36.

As shown in Fig. 2, there are two of these offset disk-plates 35 straddling the projecting hub flange and riveted to the main body portion of the disk 20, by rivets 37.

As shown in Figs. 1 and 2b, the radial walls 40 of the plate recesses 35 are made with a flaring form to conform progressively to the natural flexure of the springs under load, and the extent of this flare or curvature being formed of a predetermined character in order to cause such extent of spring yield as may be desired, in accordance with the conditions of use. The flaring or curvature of the walls of recess 35 co-acts with the curvature of the projection 33 in securing the desired total yield range.

The two elements of each pair of the spring bundles, as shown in Fig. 1, are slightly flexed towards each other in their normal position in the disk recesses referred to.

It will thus be seen that the pairs of spring bundles constitute the driving connection between the driving disk and the driven hub; and when for example, the engine is driving through the clutch disk and the disk is turning on one direction, one element of each pair of spring-bundles is being flexed by the turning power of the disk through contact of the flaring wall 40 with the respective spring-bundle elements.

When conversely the vehicle may be coasting, then the other set of elements of the respective spring-bundles come into operation with corresponding relation to the opposite flared or curved walls of the plate recess.

In this manner, as explained in detail in the application above referred to, the device can be calibrated in any desired manner for driving or coasting conditions, one set of elements of the spring being used for the driving conditions and the other set being used for coasting condition.

The hub intervening projections 33, as above referred to, are of utility in this flexing of the spring-bundles, the extent of the curvature of the tapered walls being adjusted to suit the desired conditions.

It will thus be seen that with this arrangement of the spring-bundles a certain amount of relative movement is permitted between the driving disk and the driven hub, as predetermined by the construction referred to; and one set of springs operating to receive and dampen vibration impulses from the driving member and the other set to receive and dampen vibration impulses from the driven member.

The improvement in the present application over the previous application above referred to resides in the interposition of an intermediate member or roller 50 between each of the two elements of the pairs of spring-bundles referred to. The general purpose of these rollers is to relay the pressure from one spring-pack or spring-bundle to the other, and the roller is preferably mounted loosely in the space enclosed by the spring pairs and by the hub projections 33, so that the rollers are stationed in a floating position except for the pinch tension of the spring-bundles.

A T-shaped projection 51 is straddle-mounted at the outer ends of the bundle pairs so that the inwardly projecting leg also assists in holding the rollers in proper radical position when under centrifugal force and assists in preventing undue wedging action of the rollers. It has been found that the addition of these rollers aids materially in the improved operation and life of the vibration dampener. In general, it may be said that one of the primary functions of these rollers, is to relay automatically as needed an ever increasing proportion of the torque load being transmitted from the loaded spring bundle or pack to the opposite long end of the idle pack in either direction and at the same time without appreciably affecting the normal low, or total high, range of the dampener; also to assist in absorbing undue shock and to assist in eliminating excessive wind-up, as it is known in the art.

The advantages of the double spring-bundle constructions, set forth in the application referred to, and the further advantages of the rollers described, will be apparent in the operation of these devices.

It may be pointed out that these relay rollers are free to follow the general motion about the spring-bundle or spring-pack centers and thus automatically function to relay a portion of the heavier load on one set of springs across and into the opposite bundle that is approaching a semi-neutral or idle condition. This action also tends to support the heavier loaded bundles and distribute their flexing range over an increased section of the bundles.

Furthermore, while in certain cases not affecting the low amplitude capacity of the dampener, these rollers may also assist proper dampening action at the higher amplitude by automatically governing and increasing the inter-leaf friction as needed to avoid abrupt reactions of the bundles.

These rollers may also further assist in retaining the desired initial tension of the twin-pack groups when at neutral or not under a loaded condition in either direction by automatically locating the hub assembly in a truly neutral or zero range position, so that slight movement in either direction of either member results in uniform resistance through the certain group of packs to which the torsional load is applied.

The rollers therefore serve to modify in an advantageous manner the action of the spring-bundles referred to in the above mentioned application.

As shown in Fig. 2a, the recesses 32 of the hub-flange have their outer walls (that is, the walls opposite to the projection 33) slightly rounded at the extreme corners 60 so as thereby to prevent injury to the spring packs under certain severe shocks. The rounded corners 60 in Fig. 2a are shown in somewhat exaggerated form for the sake of clearness.

What is claimed is as follows:—

1. A vibration dampener comprising a driving member and a driven member with provisions for connecting them to permit relative movement therebetween, a pair of springs interposed between the driving and the driven member to permit driving of the latter by the former, one of said springs being positioned to receive a vibration impulse from the driving member, and the other of the pair being positioned to receive a vibration impulse from the driven member, and a floating intermediate member loosely interposed between the two springs to relay the pressure from one spring to the other in either direction.

2. A vibration dampener comprising a hub, a disk element mounted on the hub and carrying friction material, means connecting the disk and hub together while permitting them to have relative angular movement, said means comprising bundles of leaf-springs, each bundle having a portion secured in the hub and another portion received in a recess in the disk element, the bundles being arranged in pairs with the bundles of each pair having portions in the same disk recess, and a floating roller interposed between each of the bundles of said respective pairs.

3. A vibration dampener comprising the elements set forth in claim 2, together with a projection in each hub recess separating the ends of the spring bundles therein and on which said rollers are stationed.

4. A vibration dampener comprising the elements set forth in claim 2, and wherein said disk element has the walls of its recesses flared or curved to conform progressively to the natural flexure of the springs.

5. A vibration dampener comprising the elements set forth in claim 2, with a projection in each hub recess separating the ends of the spring bundles therein and on which said rollers are stationed, said disk recesses being flared or curved to conform progressively to the natural flexure of the springs, and said hub projections also having curved outwardly converging surfaces facing said bundles.

6. A vibration dampener comprising the elements set forth in claim 2, together with retaining means for holding said rollers in place between the spring-pairs.

7. A vibration dampener comprising the elements set forth in claim 2, together with roller-retaining means comprising a member mounted upon the outer ends of the spring-pair and having a leg projecting inwardly between the spring packs to prevent displacement of the roller.

8. A vibration dampener comprising a driving member and a driven member with provisions for connecting them to permit relative movement therebetween; a pair of springs interposed between the driving and the driven member to permit driving of the latter by the former and vice versa, one of said springs being positioned to be acted upon by a flexure-producing surface of the driving member whereby to receive a vibration impulse from the driving member, and the other spring of the pair being positioned to be acted upon by a flexure-producing surface of the driven member, whereby to receive a vibration impulse from the driven member; and an intermediate member independent of said flexure-producing surfaces, and interposed between the two springs to relay the pressure from one spring to the other and thereby utilize the conjoint flexing action of both springs for whichever of said vibration impulses is taking place.

9. A vibration dampener comprising a hub, a disk element mounted on the hub and carrying friction material; means connecting the disk and hub together while permitting them to have relative angular movement, said means comprising bundles of leaf-springs, each bundle having a portion secured in a recess in the hub and another portion received in a recess in the disk element, the bundles being arranged in pairs with the bundles of each pair having portions in the same disk recess, and the outer walls of said hub-recesses being slightly rounded off at their outer corners; and a floating roller interposed between each of the bundles of said respective pairs.

ELMER V. J. TOWER.